US008108556B2

(12) United States Patent
Gillespie et al.

(10) Patent No.: US 8,108,556 B2
(45) Date of Patent: Jan. 31, 2012

(54) MECHANISMS FOR TEMPORAL BUILDING AND PARSING SIP MESSAGES

(75) Inventors: Donald E. Gillespie, Boulder, CO (US); Robert C. Steiner, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 239 days.

(21) Appl. No.: 12/489,569

(22) Filed: Jun. 23, 2009

(65) Prior Publication Data

US 2010/0325312 A1 Dec. 23, 2010

(51) Int. Cl.
*G06F 15/16* (2006.01)

(52) U.S. Cl. .......................................... 709/246; 709/206

(58) Field of Classification Search .................. 709/206, 709/216, 246
See application file for complete search history.

(56) References Cited

U.S. PATENT DOCUMENTS 6,115,721 A * 9/2000 Nagy .................................... 1/1
6,625,718 B1 9/2003 Steiner
2001/0007107 A1* 7/2001 Yamaguchi ....................... 707/1
2005/0243747 A1 11/2005 Rudolph
2006/0089966 A1 4/2006 Stille et al.
2006/0165043 A1 7/2006 Yoon
2006/0183491 A1 8/2006 Gundu et al.
2006/0209775 A1 9/2006 Lim et al.
2006/0268857 A1* 11/2006 Bessis et al. .................. 370/389
2007/0121596 A1* 5/2007 Kurapati et al. .............. 370/356
2007/0153775 A1 7/2007 Renschler
2007/0258451 A1 11/2007 Bouat
2009/0157596 A1* 6/2009 Couch et al. ...................... 707/1

OTHER PUBLICATIONS

U.S. Appl. No. 12/489,574, Balasaygun et al. (Jun. 23, 2009).
Official Action for U.S. Appl. No. 12/489,574, mailed Sep. 17, 2010.
Official Action for U.S. Appl. No. 12/489,574, mailed Mar. 3, 2011 12 pages.

* cited by examiner

*Primary Examiner* — Ario Etienne
*Assistant Examiner* — El Hadji Sall
(74) *Attorney, Agent, or Firm* — Sheridan Ross P.C.

(57) ABSTRACT

Methods, devices, and systems for employing binary objects representing SIP messages. More specifically, a binary SIP stack is provided which allows a mechanism to enhance the efficiency of communications and more particularly to enhance the efficiency of SIP communications between SIP network elements. Also, mechanisms are provided which allow for a SIP stack to be easily and efficiently generated, transmitted over a communication network, and parsed/processed by a communication device.

9 Claims, 5 Drawing Sheets

Receive SIP Message — 604
Convert Pointers For Use By Communication Device — 608
Process Message — 612

MECHANISMS FOR TEMPORAL BUILDING AND PARSING SIP MESSAGES

FIELD OF THE INVENTION

The invention relates generally to communications and more specifically to messages used to facilitate communications.

BACKGROUND

Currently, Session Initiation Protocol (SIP) messages require a significant amount of processing due to their extensive headers and strings. The SIP stacks currently use objects and strings scattered throughout memory. The cost of accessing random memory addresses causes excessive cache invalidation limiting the performance of the code. Further, in order to send a SIP message, the binary representation of the message (objects and strings) must be converted back into a full text message and then parsed by the receiver side, requiring additional time for processing on both ends and limiting the communication rate. Given the advanced communication rates in other communication protocols, users may be hesitant to adopt SIP as their primary communication protocol even though it provides many additional feature offerings.

SUMMARY

Certain technologies have been developed to increase general memory efficiency. As one example, U.S. Pat. No. 6,625,718 to Steiner, the entire contents of which are hereby incorporated herein by reference, describes a self-relative pointer for use in a software data structure. This concept saves a significant amount of memory and also provides for quicker compiling/decompiling and more efficient code. Using this solution, complex objects could be passed between processes and over networks without special conversion and extra intermediate memory storage. The '718 patent does not, however, address memory allocation when generating electronic communications, such as electronic messages and more particularly SIP messages nor did it address a relative store messaging cache.

Accordingly, there exists a need to enhance the efficiency of communications and more particularly to enhance the efficiency of SIP communications. Also, there exists a need for SIP messages that can be easily and efficiently generated, transmitted over a communication network, and parsed/processed by a communication device.

These and other needs are addressed by embodiments of the present invention. More specifically, the present invention, in one embodiment, provides a method of generating, in a communication device, an electronic message for transmission across a communication network, comprising:

allocating a contiguous memory segment of the communication device for storing electronic message data, the segment comprising a fixed portion and a variable portion; and creating a pointer in the fixed portion of the memory segment that points to the variable portion of the memory segment, wherein the pointer is a self-relative pointer.

In accordance with at least some embodiments of the present invention, a SIP message is provided with a self-relative pointer to data (strings, headers, and/or objects) and a temporally allocated store relative to the message object. The SIP message may be interchangeable between two modes (normal mode and wire mode). In the wire mode or offset mode the SIP message is transportable as a packet over any media, medium, or communication network. The data can be transmitted to another machine or moved in memory with no building and parsing of the SIP message. In this mode, a self-relative pointer offset may be used.

In the normal mode, or binary mode, the SIP message is at a particular device and can be parsed into a binary object with pointers used for strings headers and other objects referenced by the message into a single contiguous memory block. The binary form of the message can be converted to the wire mode by toggling the relative pointers to the wire mode (by employing a subtract operation whereby the distance from the pointed-to memory location to the pointing memory location is determined as a scalar value). This allows the binary object to be sent over the wire to another device. On the receiving end, the pointers are converted to normal mode and the SIP message can be used immediately. Previous solutions required the SIP message be built into a text message, sent and then parsed on the receiving end. Since parsing and building are the most expensive operations in SIP messaging, embodiments of the present invention vastly increases performance and Central Processing Unit (CPU) loading.

Utilization of a fixed relative pointer helps increase memory efficiency. A message can be formed as a contiguous data segment composed of a fixed and variable part. In the fixed part, variable size objects, such as message header identifiers, are stored as a relative pointer to the variable part, such as header strings, arrays, and data, of the memory segment. Since fixed relative pointers are used, the variable portion may be maintained as a contiguous chunk of data.

As one non-limiting example, a FROM header in the SIP message is a class that has a URI and a tag. Both of these fields are variable in length so the FROM header has two pointers in the fixed part that point to the actual URI and tag string in the variable part. The message would have a relative pointer that points to the FROM header.

By keeping the memory segment contiguous, modern super-scaler processors can be exploited to keep the memory segment in Level 2 (L2) cache and prevent the constant L2 cache thrashing common with prior implementations. A cache line swap is 64 bytes and can delay processing by 40-80 clock cycles, that's enough to do 80-160 floating point operations.

Additionally, the SIP message may comprise virtual pointers that point to a virtual class that can also be allocated in the variable part of the memory segment by virtue of an empty default constructor. With an empty default constructor, the new operator can be overridden and setup a virtual table (vtable) for the class during a from-wire conversion of the relative pointers from offsets to real pointers to the variable part of the message.

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" or "tool" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of embodiments of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using a server(s) and/or database (s), the invention is not limited to use with any particular type of communication system or configuration of system elements. Those skilled in the art will recognize that the disclosed techniques may be used in any communication application in which it is desirable to increase communication efficiencies.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
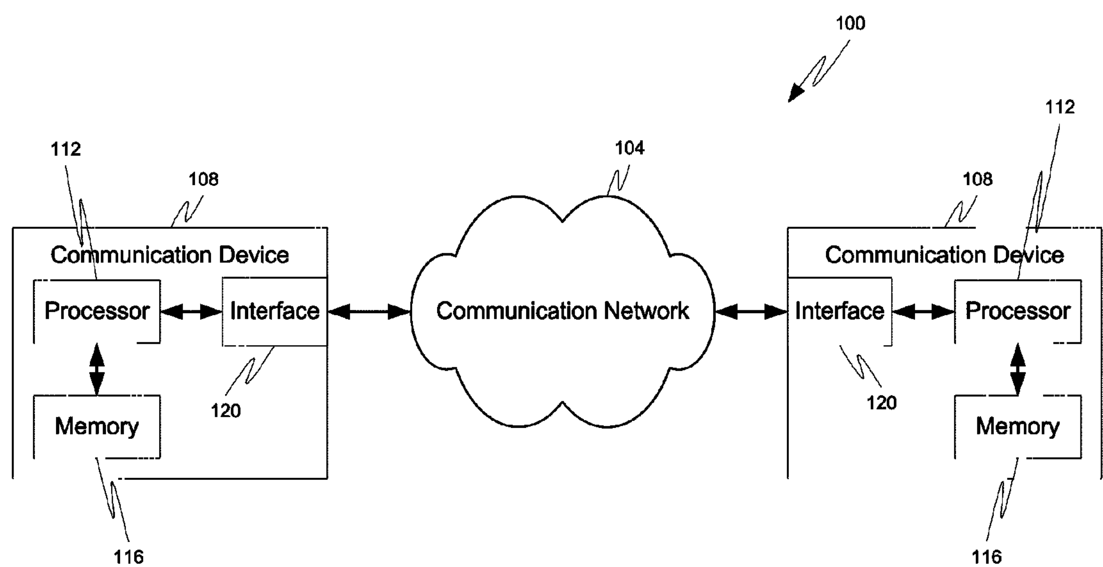
FIG. 1 is block diagram depicting a communication system in accordance with at least some embodiments of the present invention.

Referring now to FIG. 1, an exemplary communication system 100 will be described in accordance with at least some embodiments of the present invention. The communication system 100 may comprise a communication network 104 that facilitates communications between one or more communication devices 108.

The communication network 104 may be any type of known communication medium or collection of communication mediums and may use any type of protocols to transport messages between endpoints. The communication network 104 may include wired and/or wireless communication technologies. The Internet is an example of the communication network 104 that constitutes and IP network consisting of many computers and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication mediums such as coaxial cable, copper cable/wire, fiber-optic cable, antennas for transmitting/receiving wireless messages, and combinations thereof.

The communication devices 108 may be any type of known communication or processing device such as a personal computer, laptop, Personal Digital Assistant (PDA), cellular phone, smart phone, telephone, contact center resource, or combinations thereof. The communication devices 108 may be controlled by or associated with a single user or may be adapted for use by many users (e.g., an enterprise communication device that allows any enterprise user to utilize the communication device upon presentation of a valid user name and password). In general each communication device 108 may be adapted to support video, audio, text, and/or data communications with other communication devices 108. The type of medium used by the communication device 108 to communicate with other communication devices may depend upon the communication applications available on the communication device 108.

In accordance with at least some embodiments of the present invention, the communication devices 108 may alternatively, or additionally, comprise a server, switch, gateway, router, proxy, or other type of network communication device. More specifically, the communication device 108 is not necessarily limited to user communication devices. Rather, the present invention contemplates that a communication device 108 may comprise any device capable of receiving, sending, generating, processing, and/or parsing messages. Accordingly, a communication device 108 may include user devices as well as network and/or enterprise devices.

As can be seen in FIG. 1, the communication devices 108 may be equipped with a processor 112, memory 116, and a network interface 120. Certain details of the processor 112 and memory 116 are described in U.S. Pat. No. 6,625,718, the entire contents of which are hereby incorporated herein by reference. More specifically, the memory 116 may be adapted to store electronic messages in a contiguous segment of memory and that segment of memory 116 may be divided into a fixed portion and a variable portion. The fixed portion may comprise a pointer that points to associated data in the variable portion. In accordance with at least some embodiments of the present invention, the pointer in the fixed portion may be either a self-relative pointer that defines a pointed-to location in the variable portion in terms of an offset value from its own location. In other words, the address of the pointer is offset by the value of the pointer obtaining the address of the pointed-to location.

The memory 116 may comprise solid-state memory resident, removable or remote in nature, such as DRAM and SDRAM. Where the processor 112 comprises a controller, the memory 116 may be integral to the processor 112. Additionally, the memory 116 may be volatile and/or non-volatile memory.

The processor 112 may be adapted to store messages received from the communication network 104 in memory 116 and/or prepare messages for transmission across the communication network 104 based on data stored in the memory 116. The network interface 120 is provided to facilitate the communication device's ability to send/receive messages across the communication network 104. In accordance with at least some embodiments of the present invention, the network interface 120 may comprise a network adapter such as a modem, a network card, an Ethernet card or Ethernet port, a USB port, a wireless adapter, or any other known type of network interface.

Figure 3:
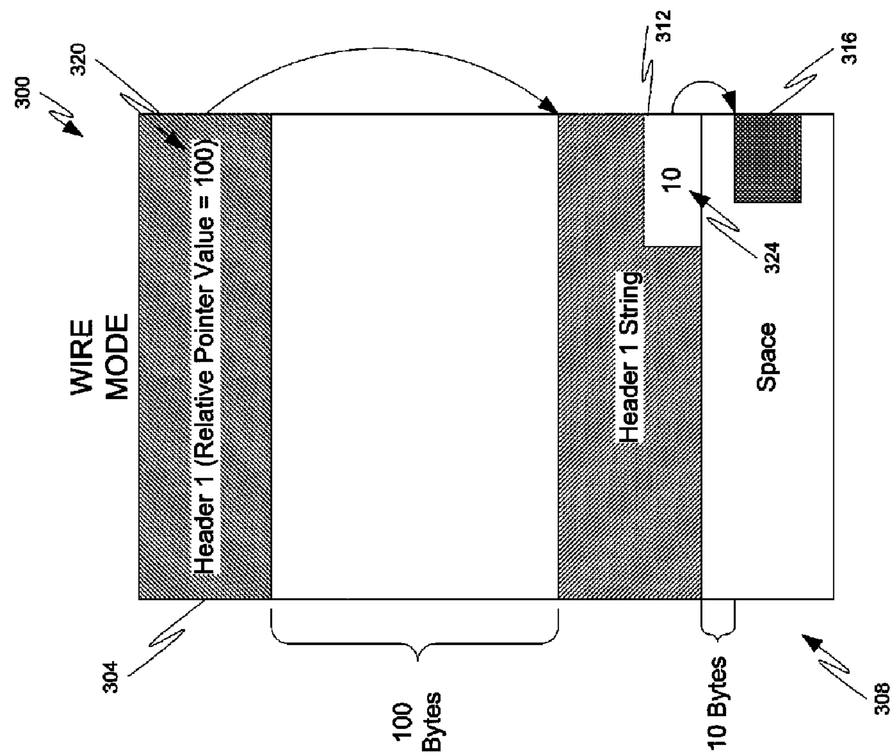
FIG. 3 is a block diagram depicting a second format of an electronic message in accordance with at least some embodiments of the present invention.
Figure 2:
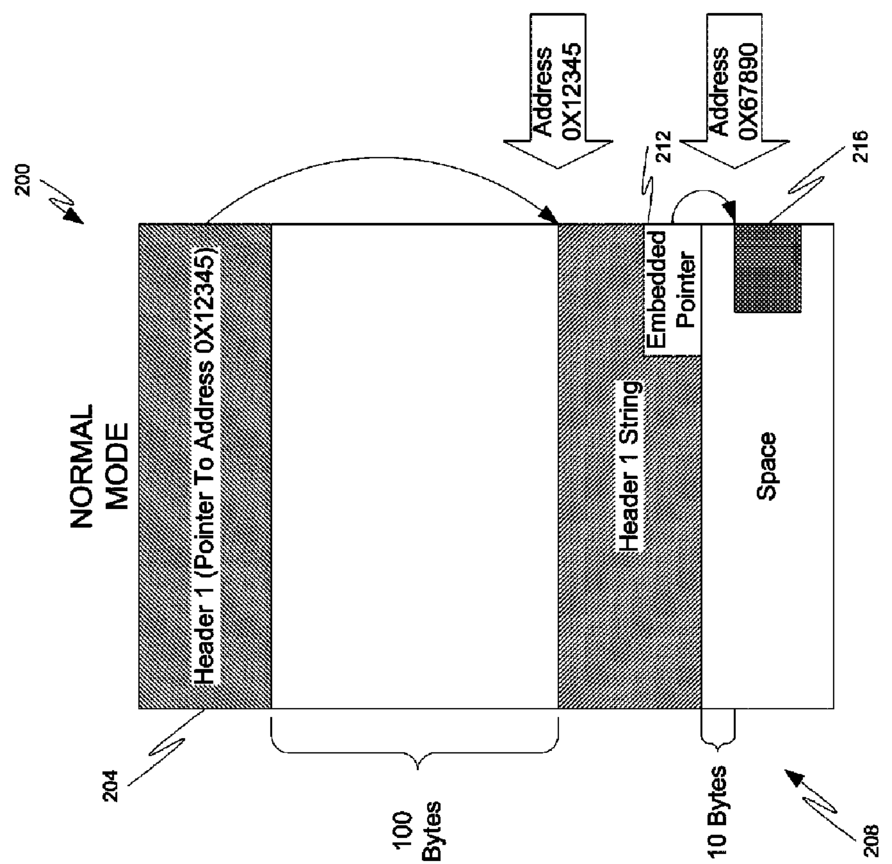
FIG. 2 is a block diagram depicting a first format of an electronic message in accordance with at least some embodiments of the present invention.

With reference now to FIGS. 2 and 3, additional details of an electronic message 200, 300 will be described in accordance with at least some embodiments of the present invention. As can be seen in FIG. 2, the electronic message 200 may occupy a contiguous segment of memory that is divided into a fixed portion 204 and a variable portion 208. A header may be provided in the fixed portion 204 that points to another memory location in the variable portion 208. The fixed portion 204 is generally used to store pointers and other relatively small amounts of data. The variable portion 208, on the other hand, is generally used to store strings of data. However, embedded pointers 212 may also be included in the variable portion 208 that point to another memory location 216 also within the variable portion 208 of the contiguous memory segment.

In a normal mode, the electronic message 200 is at a particular communication device 108 and may be stored in memory 116 of such a device 108. In this state, the message 200 may be parsed into a binary object such that additional processing based on the message contents (i.e., contents in the variable portion 208) can be executed by the communication device 108. In the normal mode, the pointers in the message 200 identify a pointed-to location by actually identifying the address of the memory location. For example, if the pointed-to memory location comprises a memory address of 0X12345, then the pointer for that pointed-to memory location would actually identify the memory address 0X12345. In this mode, the distance between the pointer memory location and the pointed-to memory location is not necessarily reflected by the pointer itself. This is a traditional pointer that can be readily processed by the communication device 108.

As can be seen in FIG. 3, however, the message 200 may be converted from the normal mode into a wire mode. Once in the wire mode or offset mode the message 300 is transportable over any media or communication medium in the communication network 104. More specifically, if the message 300 comprises an electronic message such as a SIP message, then the message 300 is a SIP packet in the wire mode. One advantage of the wire mode is that the data in the message 300 can be transmitted to another communication device 108 or be moved in memory without any building and parsing of a SIP message. This greatly reduces the amount of processing required of the SIP message. Furthermore, in this mode, a self-relative pointer is used as opposed to the actual pointers employed in the normal mode. The self-relative pointer is a scalar value 320, 324 that identifies a distance between the pointer memory location and the pointed-to memory location.

The binary form of the message 200 can be converted into the wire-mode by toggling the pointers into self-relative pointers. This is accomplished by executing a subtract operation that subtracts the distance between the pointed-to location and the location of the self-relative pointer. Since the message is maintained in a contiguous segment of memory that is divided into a fixed portion 304 and a variable portion 308, the self-relative pointer 320 in the fixed portion 304 identifies the actual distance in terms of memory size (e.g., 100 bytes in the example depicted in FIG. 3) from the pointer location to the pointed-to location. Accordingly, the self-relative pointer can be represented as a simple scalar value 320, 324. Additionally, embedded pointers 212 are also converted into self-relative pointers 312 similar to the conversion of the pointers in the fixed portion 204, 304. In the example depicted in FIG. 3, the embedded pointer 312 comprises a scalar value 324 having a value of 10 that corresponds to the distance of 10 bytes between the pointer location and the pointed-to location 316.

By keeping the message 200, 300 in a contiguous chunk of data, processor intensive "new" operations can be replaced with a simple check for space (i.e., space available in the contiguous memory segment), add, and return operation. This series of operations is an order of magnitude faster for allocation of a new portion of memory as compared to previous "new" operations.

Furthermore, in accordance with at least some embodiments of the present invention, memory is not deleted when a string or the like is removed from the message 200, 300. Therefore, destructors are not necessary, thereby simplifying the operation and enhancing the speed with which the message 200 can be processed at a particular communication device 108.

While the message 200, 300 has been described as having two distinct modes or states corresponding to two distinct forms of pointers, one skilled in the art will appreciate that distinct message states and pointer forms are not necessarily required. More specifically, embodiments of the present invention contemplate that the pointers in the message may always be in the form of self-relative pointers. In other words, the message may comprise self-relative pointers even when it is at a particular communication device 108 and/or is being processed (e.g., parsed) by that communication device 108. Furthermore, if both communication devices 108 are capable of processing the message when that message has self-relative pointers, then the communication devices 108 may negotiate that fact during call set-up and agree to use messages with self-relative pointers.

Figure 4:
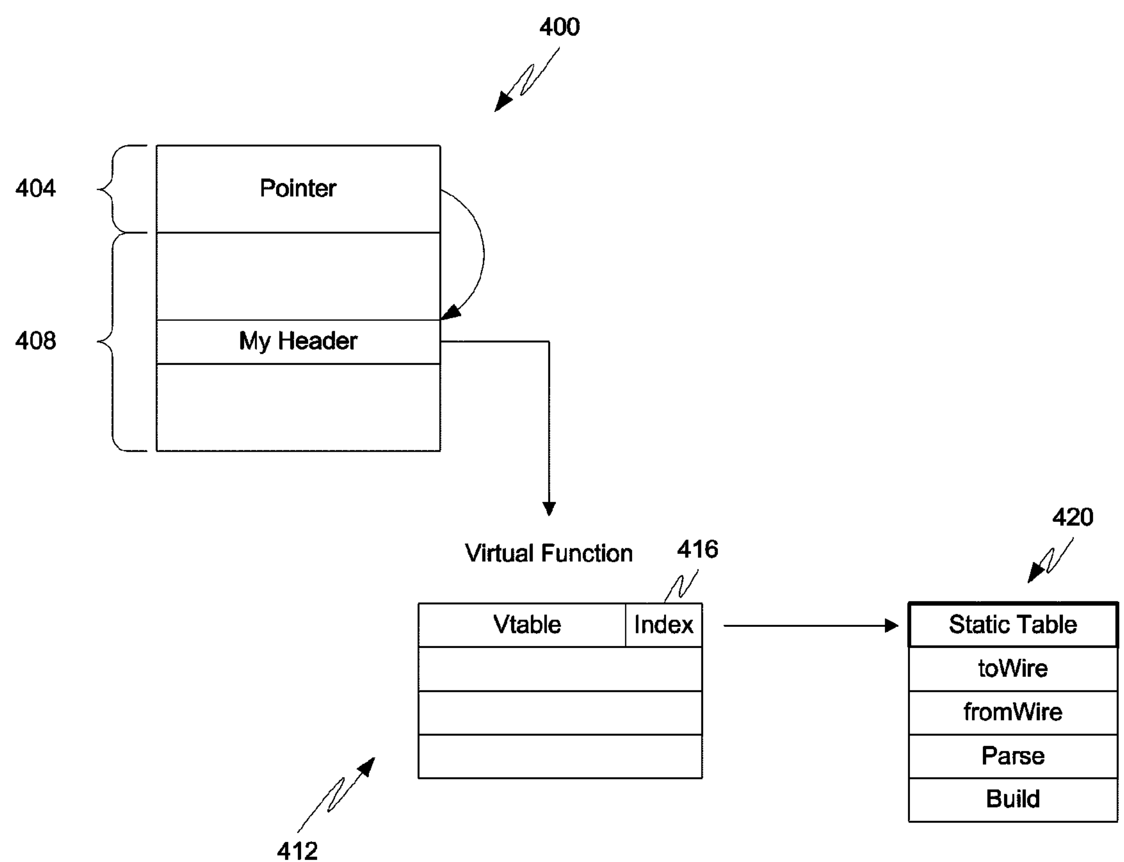
FIG. 4 is a block diagram depicting a series of data structures used to build a virtual class in accordance with at least some embodiments of the present invention.

With reference now to FIG. 4, an exemplary message 400 comprising virtual pointers will be described in accordance with at least some embodiments of the present invention. Again, the message 400 is generally provided in a contiguous segment of memory comprising a fixed portion 404 and a variable portion 408. More specifically, the message 400 may be embodied as a SIP message that comprises virtual pointers that point to a virtual class. The virtual pointer may reside in the fixed portion 304. Of course, the virtual pointer may also be embodied as an embedded pointer in the variable portion 408. Furthermore, the virtual pointer may be a normal pointer or a self-relative pointer. The state of the virtual pointer (i.e., normal or self-relative) may depend upon whether the message 400 is residing at a particular communication device 108 or is being transmitted across a communication medium in the communication network 104, although such a dependence is not necessary.

As can be seen in FIG. 4, the pointed-to location may comprise an empty default constructor that is associated with a virtual function 412. The empty constructor may be in a virtual base class that can be used to generate a virtual table for the virtual function. Different operators (e.g., toWire operators, fromWire operations, parse operators, build operators) may be referenced by the virtual function via an index 416. The index may identify one of the available operators in the static operator table 420 for use when the virtual class is called. Accordingly, the virtual pointer may be used to request one of many different operators in the static table 420, and the operator selected may vary depending upon where the message resides and what operation is needed. In other words, the same virtual pointer may be used to execute a to-wire conversion of the message as well as a from-wire conversion of the message. As one example, with an empty default constructor, the "new" operator can be overridden and setup the virtual table 412 for the class during the from-wire conversion of the self-relative pointers from offsets to actual pointers that actually identify address locations in the variable portion of the message.

This model basically walks the data structure and executes commands as the appropriate instruction is approached in the data structure. In an alternative embodiment, the self-relative pointers may be mapped such that they can be switched relatively quickly without traversing the entire data structure.

Figure 5:
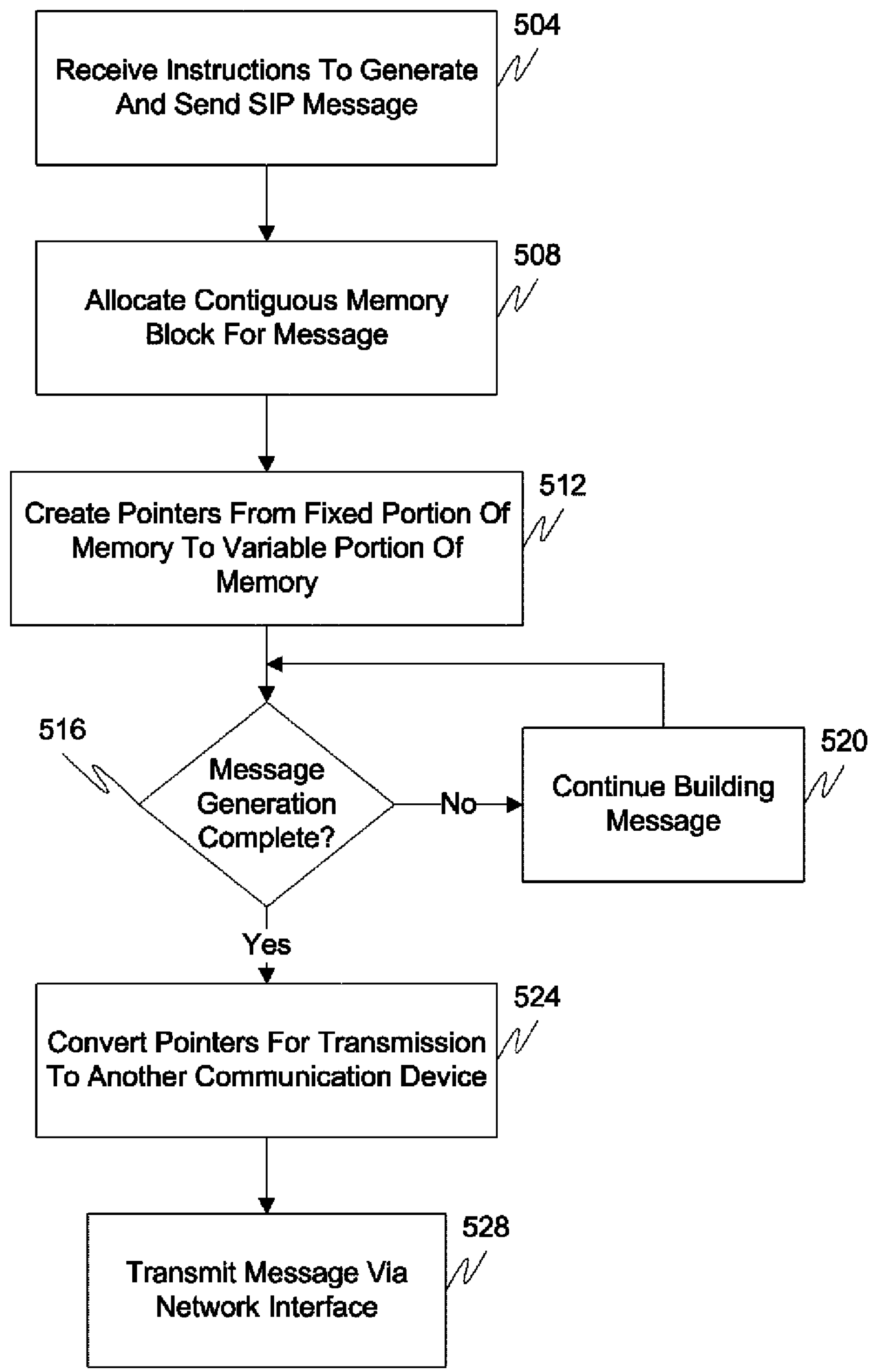
FIG. 5 is a flow diagram depicting a message generation and transmission method in accordance with at least some embodiments of the present invention.

Referring now to FIG. 5, an exemplary message generation and transmission method will be described in accordance with at least some embodiments of the present invention. The method is initiated when instructions are received to generate and send a SIP message (step 504). These instructions may be received directly from a user of the communication device 108 and/or may be received from an internal component of the communication device. For instance, the user may take the communication device 108 off-hook and dial a particular number. Upon completion of dialing the number the user may hit a "send" button on the device 108 or may simply wait for the communication device 108 to begin dialing automatically after a predetermined amount of time. The predetermined amount of time or the actual receipt of user input at the "send" button may correspond to instructions that initiate the method.

Thereafter, the method continues with the communication device 108 allocating a contiguous memory block for the message (step 508). The contiguous memory segment may be allocated from any type of local or remote memory. The contiguous memory block is then divided into a fixed portion and a variable portion. Pointers are then created in the fixed portion of memory that point to memory locations in the variable portion of memory (step 512). This allows the pointers in the fixed portion maintain a relatively small size (e.g., on the order of bits or a couple of bytes), while allowing actual data (e.g., strings, objects, headers, etc.) to be stored in the variable portion. Furthermore, the contents of the variable portion of memory may be changed or updated without altering the pointers in the fixed portion. This allows the data to be accessed relatively easily regardless of whether it has been changed or not. As noted above, pointers may also be created in the variable portion of the contiguous memory block.

The method continues by determining whether the message generation process is complete (step 516). If the message is not yet completed, then the message generation process continues (step 520) until it is determined that the message is fully generated (as determined in step 516). Once the message generation process is complete, however, the message is then prepared for transmission across the communication network 104. To facilitate transmission across the communication network 104, the message may be converted from a normal mode to a wire mode, whereby the pointers are transformed from normal pointers into self-relative pointers (step 524). This conversion may not be necessary, however, if the message was originally generated with self-relative pointers.

Once the message has been adequately prepared for transmission across the communication network, the method continues with the communication device 108 transmitting the message across the communication network 104 via its network interface 120 (step 528).

Figure 6:
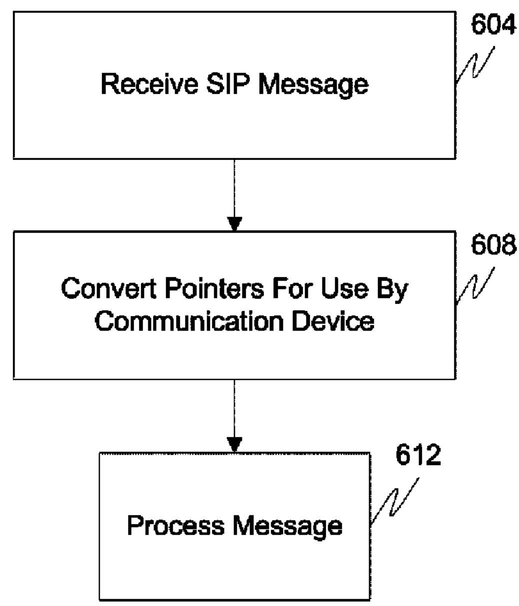
FIG. 6 is a flow diagram depicting a message processing method in accordance with at least some embodiments of the present invention.

Referring now to FIG. 6, an exemplary message receiving method will be described in accordance with at least some embodiments of the present invention. The method begins when a message is received at a communication device 108 (step 604). The received message may then be converted from the wire mode to a normal mode. If the receiving communication device 108 needs to transform the pointers of the message to complete this conversion, then the pointers are converted from self-relative pointers to actual pointers (step 608). As noted above, however, the receiving communication device 108 may have negotiated with the sending communication device 108 to use self-relative pointers even during processing. In such an embodiment, the conversion of pointers from their self-relative state may not be necessary.

After the message has been converted to a useable format for the communication device 108, the method proceeds with the communication device 108 processing the message and performing any necessary tasks on the message (step 612). The way in which the message is processed may vary depending upon the nature of the receiving communication device 108. For instance, if the receiving communication device 108 is the target communication device 108, then the message may be fully parsed and its payload (e.g., voice data, image data, or other types of data) may be provided or otherwise displayed to the user of the communication device 108. If, however, the receiving communication device 108 is a communication device within the communication network 104, then the receiving communication device 108 may process the message just enough to identify another communication device 108 to which the message should be forwarded.

Although embodiments of the present invention have generally discussed the generation of a SIP electronic message, those skilled in the art will appreciate that self-relative pointers may be useful for many other types of communication messages. Furthermore, although embodiments of the present invention have generally discussed the use of classes in connection with the generation and format of an electronic message. Those skilled in the art will appreciate that any type of programming language may be used to generate a message in accordance with embodiments of the present invention. More particularly, C++, Java, any object oriented programming language, native programming languages, or any combination thereof may be employed to generate messages without departing from the spirit of the present invention.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication and computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, Java® (although the invention is not limited to these technologies), as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for generating communication messages comprising a self-relative pointer. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method of generating, in a communication device, an electronic message for transmission across a communication network, comprising:

allocating a contiguous memory segment of the communication device for storing electronic message data, the segment comprising a fixed portion and a variable portion; and creating a pointer in the fixed portion of the memory segment that points to the variable portion of the memory segment, wherein the pointer is a self-relative pointer, wherein the electronic message is in a wire mode whereby the electronic message is capable of transmission across a communication network to a target communication device, wherein the self-relative pointer comprises a scalar value in the fixed portion that identifies a distance from the fixed portion to a corresponding object in the variable portion, and wherein the object comprises information used to route the electronic message across the communication network to the target communication device.

2. The method of claim 1, further comprising:

receiving the electronic message;

converting the electronic message from the wire mode to a normal mode, wherein converting the electronic message to the normal mode comprises transforming the pointer from a self-relative pointer to an address identifier that identifies a memory address which contains the object.

3. The method of claim 1, wherein the object includes at least one of a Uniform Resource Identifier string and tag string and wherein the object is one of a string and array.

4. A method of generating, in a communication device, an electronic message for transmission across a communication network, comprising:

allocating a contiguous memory segment of the communication device for storing electronic message data, the segment comprising a fixed portion and a variable portion; and creating a pointer in the fixed portion of the memory segment that points to the variable portion of the memory segment, wherein the pointer is a self-relative pointer, wherein the pointer comprises a virtual pointer that points to a virtual class, the virtual class being allocated in the variable portion of the memory segment by an empty default constructor.

5. A communication device, comprising:

memory containing a contiguous number of memory locations dedicated for storing electronic message data, the contiguous number of memory locations being divided into a fixed portion and a variable portion, wherein a pointer in the fixed portion points to a memory location in the variable portion; and a processor operable to generate a message based on the electronic message data in the contiguous number of memory locations, wherein the pointer is a self-relative pointer, wherein the electronic message is in a wire mode whereby the electronic message is capable of transmission across a communication network, wherein the communication device further comprises a network interface, wherein the processor is operable to cause the electronic message to be transmitted across the communication network to a target communication device via the network interface, wherein the self-relative pointer comprises a scalar value in the fixed portion that identifies a distance from the fixed portion to a corresponding object in the variable portion, and wherein the object comprises information used to route the electronic message across the communication network to the target communication device.

6. The device of claim 5, wherein the message is adapted to be from the wire mode to a normal mode by transforming the pointer from a self-relative pointer to an address identifier that identifies a memory address which contains the object.

7. The device of claim 5, wherein the object includes at least one of a Uniform Resource Identifier string and tag string.

8. A communication device, comprising:

memory containing a contiguous number of memory locations dedicated for storing electronic message data, the contiguous number of memory locations being divided into a fixed portion and a variable portion, wherein a pointer in the fixed portion points to a memory location in the variable portion; and a processor operable to generate a message based on the electronic message data in the contiguous number of memory locations, wherein the pointer comprises a virtual pointer that points to a virtual class, the virtual class being allocated in the variable portion of the memory segment by an empty default constructor.

9. A non-transitory communication medium adapted to transport messages between communication devices, the non-transitory communication medium comprising a first message transmitted from a first communication device to a second communication device, the first message being in a wire mode and being adapted for storage in a contiguous number of memory locations being divided into a fixed portion and a variable portion, wherein a pointer in the fixed portion points to a memory location in the variable portion, wherein the self-relative pointer comprises a scalar value in the fixed portion that identifies a distance from the fixed portion to a corresponding object in the variable portion, and wherein the object comprises information used to route the first to the second communication device.

* * * * *